United States Patent

Higashi

[11] 3,949,358
[45] Apr. 6, 1976

[54] SIGNALLING APPARATUS FOR AUTOMOTIVE VEHICLES

[75] Inventor: Manabu Higashi, Yamato, Japan

[73] Assignee: Niles Parts Company Limited, Tokyo, Japan

[22] Filed: Jan. 10, 1975

[21] Appl. No.: 540,216

[52] U.S. Cl. ............... 340/52 F; 340/184; 340/412; 307/10 R
[51] Int. Cl.² .......................................... G08B 19/00
[58] Field of Search ...... 340/52 D, 52 R, 52 F, 181, 340/184, 185, 201 R, 203, 412, 413, 415; 307/10 R

[56] References Cited
UNITED STATES PATENTS

| | | | |
|---|---|---|---|
| 3,626,367 | 12/1971 | Howard | 340/52 F |
| 3,651,454 | 3/1972 | Venema et al. | 340/52 F |
| 3,683,197 | 8/1972 | Ives | 307/10 R |

*Primary Examiner*—Alvin H. Waring
*Attorney, Agent, or Firm*—Gifford, Chandler & Sheridan

[57] ABSTRACT

This invention has for its object to activate buzzers and lamps provided in warning and signalling apparatuses for automotive vehicles by the vibration of a common source such as to simplify the construction as well as to ensure reliable function. This invention resides in electrically stimulating a tiny quartz-oscillator sealed in a capsule to vibrate at an ultra-high frequency, passing the signal from the oscillator through a frequency-divider so as to split it into a number of lesser frequency signals, amplifying them and feeding appropriate signals to buzzers and lamps.

5 Claims, 1 Drawing Figure

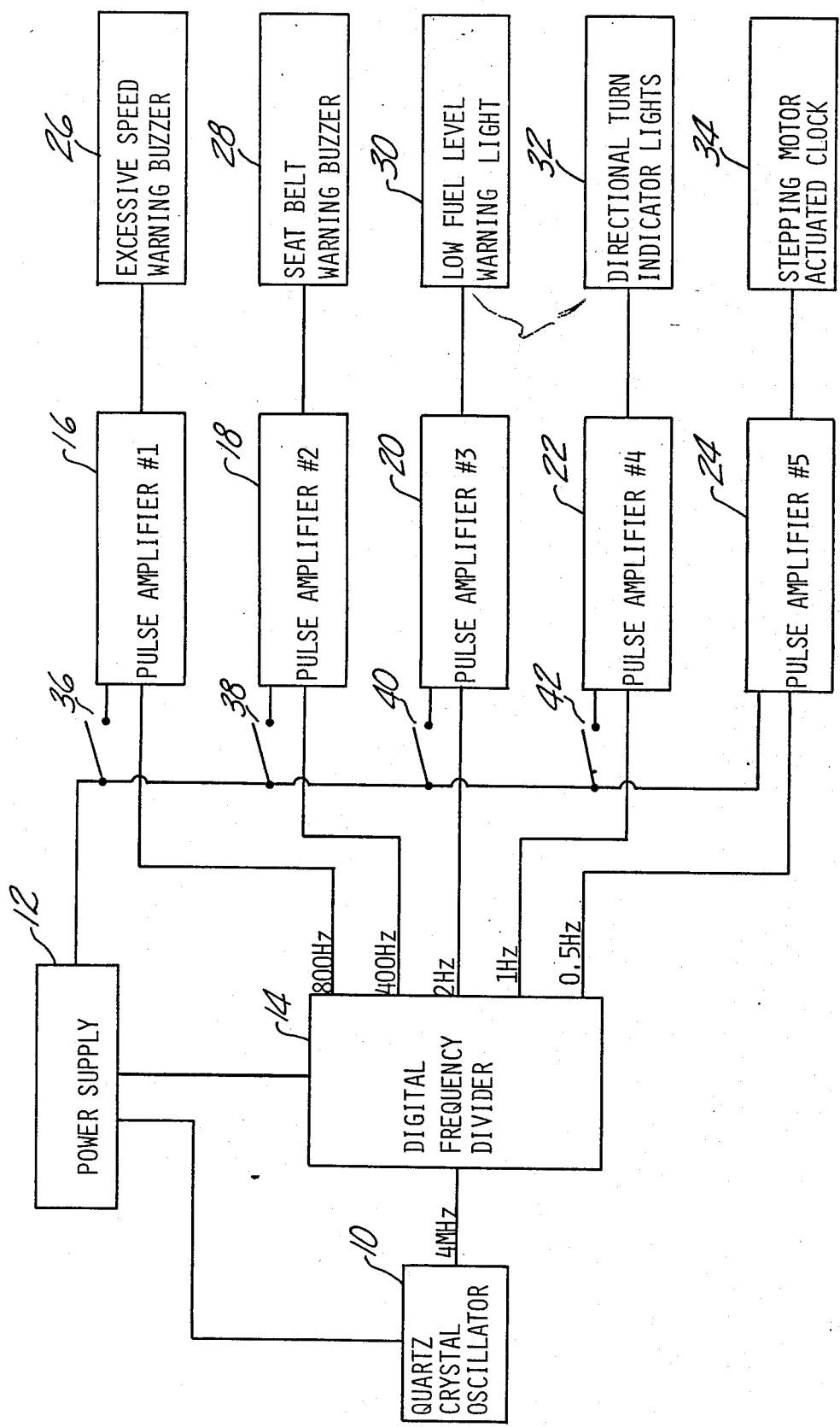

SIGNALLING APPARATUS FOR AUTOMOTIVE VEHICLES

BACKGROUND OF THE INVENTION

I. Field of the Invention

This invention relates to a method of operating warning and signalling apparatuses for automotive vehicles.

II. Description of the Prior Art

Automotive vehicles are often provided with warning apparatuses such as an apparatus for warning that the speed of the vehicle is exceeding a preset limit. This warning is given by means of a buzzer and/or blinking lamp which are activated by a speed sensor connected to the speedometer cable. Another warning apparatus indicates low fuel level by means of a blinking lamp which is activated by the fuel gauge when the fuel level falls below a preset amount. Still another warning apparatus indicates brake oil leakage by means of a blinking lamp which is activated by a pressure switch inserted in the oil delivery pipe of the brake system. Various other warning apparatuses are each provided with either a buzzer or blinking lamp alone, or with both a buzzer and a blinking lamp. The turn signalling apparatus is provided with manipulatable means to effect flashing of either the left-hand set of lamps or the right-hand set of lamps to indicate, respectively, a left-hand or a right-hand turn.

Heretofore, these buzzers and lamps have been activated by intermittent electric currents generated separately by each apparatus.

SUMMARY OF THE INVENTION

This invention has for its object to activate all of the above mentioned buzzers and lamps by means of a common vibrating source so as to simplify the constructions for each apparatus and ensure more reliable function.

According to this invention, a tiny quartz-oscillator sealed in a capsule is electrically stimulated by a battery and the ultra-high frequency signal from it is fed to a frequency-divider which produces a number of signals of appropriate lower frequencies, which are amplified and fed to the buzzers and lamps.

BRIEF DESCRIPTION OF THE DRAWING

The many objects and advantages of the present invention will become apparent to those skilled in the art when the following description of the best mode contemplated for practicing the invention is read in conjunction with the accompanying drawing which is a block schematic diagram of the preferred embodiment.

DETAILED DESCRIPTION OF THE PREFERRED EMBODIMENT

Referring now to FIG. 1, a tiny, wafer thin, quartz crystal sealed in a capsule is placed in a Meacham bridge-coupling circuit to form a quartz-crystal oscillator 10. This oscilllator is electrically stimulated by a small battery in a power supply 12 to produce an ultra-high frequency signal of 4 megaHertz per second. This ultra-high frequency signal is fed to a digital frequency divider 14 which produces a plurality of electrical output signals, each of which is both predetermined and of substanstantially lower frequency than the 4 mega-Hertz input signal. In the embodiment shown, the digital frequency divider 14 produces five output signals. These signals have frequencies of 800 Hertz, 400 Hertz, 2 Hertz, 1 Hertz and 0.5 Hertz, respectively. The 800 Hertz signal is fed to a first pulse signal amplifier 16, and then to an excessive speed warning buzzer 26. The 400 Hertz signal is fed to a second pulse signal amplifier 18 and then to a seat belt warning buzzer 28. The 2 Hertz signal is fed to a third pulse signal amplifier 20 and then to a low fuel level warning light 30. The 1 Hertz signal is fed to a fourth pulse signal amplifier 22 and then to directional turn indicator lights 32. The 0.5 Hertz signal is fed to a fifth pulse signal amplifier 24 and then to a stepping motor which drives the hands of a clock 34.

In addition to amplifying the signals from the digital frequency divider 14 to appropriate useful levels, the amplifiers 16, 18, 20, 22 and 24 can also determine the on-off ratio of the signals delivered to the clock and the various lights and buzzers.

The power supply 12 is shown always connected to the fifth Pulse signal amplifer 24 which drives the stepping motor actuated clock 34. Thus, the timepiece operates continuously. Switching means 36, 38, 40 and 42 are provided as shown to allow intermittent operation of the various warning buzzers and lights.

As is clar from the above, according to this invention, the construction of the warning and signalling apparatuses can be much simplified because the electromechanical switching means associated with the buzzers and flasher units for the lamps may be eliminated. Furthermore, becuse the frequencies are alays constant always accurate, reliable functioning of the various apparatuses are assured.

From the foregoing description it will be apparent to those skilled in the art that a number of changes, adaptations, and modifications of the present invention come within the scope of the present invention, and it is intended that all such variations not departing from the spirit of the invention be considered as within the scope thereof as limited solely by the appended claims.

I claim:

1. An electronic control apparatus for use in combination with an automotive vehicle comprising:
    a common ultra-high frequency signal source;
    frequency dividing means having a plurality of output lines and having its input line connected to said source for splitting said ultra-high frequency signal to a plurality of differing lesser frequency signals so that a differing frequency signal is present on each of said output lines;
    signal processing means connected to each of said output lines of said frequency dividing means for individually amplifying and shaping each differing lesser frequency signal;
    a plurality of electronically actuated signalling devices, each device having an input connected to the output line of one of said signal processing means so that the output from said signal processing means powers said signalling device, and
    means for selectively actuating said signal processing means.

2. The electronic control apparatus of claim 1 wherein said common ultra-high frequency signal source is a quartz-oscillator.

3. The electronic control apparatus of claim 1 wherein said electronically actuated signalling device comprises an electric lamp.

4. The electronic control apparatus of claim 1 wherein said electronically actuated signalling device comprises a buzzer.

5. The electronic control apparatus of claim 1 wherein said electronically actuated signalling device comprises a clock.

* * * * *